US009578379B1

(12) United States Patent
Klappert et al.

(10) Patent No.: US 9,578,379 B1
(45) Date of Patent: Feb. 21, 2017

(54) SCENE-BY-SCENE VIEWER RATINGS

(71) Applicant: Rovi Guides, Inc., Santa Clara, CA (US)

(72) Inventors: Walter R. Klappert, Los Angeles, CA (US); Glen E. Roe, Simi Valley, CA (US); Curtis Sullivan, San Jose, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/868,876

(22) Filed: Sep. 29, 2015

(51) Int. Cl.

| | |
|---|---|
| ***H04N 21/475*** | (2011.01) |
| ***H04N 21/25*** | (2011.01) |
| ***H04N 21/258*** | (2011.01) |
| ***H04N 21/431*** | (2011.01) |
| ***H04N 21/44*** | (2011.01) |
| ***H04N 21/45*** | (2011.01) |
| ***H04N 21/466*** | (2011.01) |
| ***H04N 21/482*** | (2011.01) |
| ***H04N 21/84*** | (2011.01) |
| ***H04N 21/845*** | (2011.01) |
| ***G06K 9/00*** | (2006.01) |
| ***G11B 27/10*** | (2006.01) |

(52) U.S. Cl.
CPC ...... *H04N 21/4756* (2013.01); *G06K 9/00718* (2013.01); *G06K 9/00758* (2013.01); *G11B 27/10* (2013.01); *H04N 21/251* (2013.01); *H04N 21/25891* (2013.01); *H04N 21/4312* (2013.01); *H04N 21/44008* (2013.01); *H04N 21/4532* (2013.01); *H04N 21/4667* (2013.01); *H04N 21/4821* (2013.01); *H04N 21/84* (2013.01); *H04N 21/8456* (2013.01); *G06K 2009/00738* (2013.01)

(58) Field of Classification Search
CPC .............. H04N 21/4756; H04N 21/251; H04N 21/25891; H04N 21/4312; H04N 21/44008; H04N 21/4532; H04N 21/4667; H04N 21/4821; H04N 21/84; H04N 21/8456; G06K 9/00718; G06K 9/00758; G11B 27/10
See application file for complete search history.

(56) References Cited

U.S. PATENT DOCUMENTS 8,869,046 B2 10/2014 Brown et al.
9,003,451 B2 4/2015 Boyer et al.
9,071,871 B2 6/2015 Porter et al.
(Continued)

FOREIGN PATENT DOCUMENTS

WO WO-2010027713 A1 3/2010

*Primary Examiner* — Randy Flynn
(74) *Attorney, Agent, or Firm* — Ropes & Gray LLP

(57) ABSTRACT

Systems and methods are described herein for identifying media assets. A media guidance application may receive a first user rating for a first portion of a first media asset and a second user rating for a second portion of the first media asset. Each of the first portion and the second portion of the first media asset may be associated with metadata. The media guidance application may determine whether the second user rating is higher than the first user rating. The media guidance application may also determine a property of the first media asset determining a property of the first media asset based on the first metadata and the second metadata. In response to determining that the second user rating is higher than the first user rating, the media guidance application may identify a second media asset that is associated with the property of the first media asset.

20 Claims, 9 Drawing Sheets

1000

| | 1002 | 1004 | 1006 | 1008 | 1010 | 1012 | 1014 | 1016 | 1018 |
|---|---|---|---|---|---|---|---|---|---|
| | User | Scene No. | Start | End | Genre | Plot Location | Parental Rating | Misc | User Rating |
| 1020 | Steve | 1 | 0:00 | 0:05 | Drama | Intro | PG | - | 5 |
| 1022 | Steve | 2 | 0:28 | 0:32 | Action | Intermediate | PG-13 | - | 9 |
| 1024 | Steve | 3 | 0:34 | 0:36 | Romance | Intermediate | R | - | 6 |
| 1026 | Steve | 4 | 1:24 | 1:25 | Comedy | Intermediate | PG | - | 7 |
| 1028 | Steve | 5 | 1:31 | 1:35 | Drama | Intermediate | PG-13 | Plot Twist | 10 |
| 1030 | Steve | 6 | 2:06 | 2:14 | Drama | Intermediate | PG | - | 2 |
| 1032 | Steve | 7 | 2:38 | 2:40 | Drama | Conclusion | PG-13 | - | 3 |
| 1034 | Steve | 8 | 2:42 | 2:45 | Drama | Conclusion | PG-13 | - | 1 |

(56) References Cited

U.S. PATENT DOCUMENTS

| | | | | |
|---|---|---|---|---|
| 2007/0118873 | A1* | 5/2007 | Houh | H04N 21/8549 725/136 |
| 2008/0244681 | A1* | 10/2008 | Gossweiler | H04N 21/235 725/133 |
| 2009/0234828 | A1* | 9/2009 | Tu | H04N 21/4826 |
| 2010/0199295 | A1* | 8/2010 | Katpelly | G06F 17/30053 725/14 |
| 2012/0158755 | A1 | 6/2012 | Gammill et al. | |
| 2013/0046707 | A1* | 2/2013 | Maskatia | H04N 21/4622 705/347 |
| 2013/0297706 | A1* | 11/2013 | Arme | H04N 21/84 709/206 |
| 2013/0311575 | A1* | 11/2013 | Woods | H04N 21/6582 709/206 |
| 2014/0068433 | A1* | 3/2014 | Chitturi | H04N 21/41407 715/716 |
| 2014/0281978 | A1* | 9/2014 | Ye | H04N 21/4668 715/716 |
| 2014/0366065 | A1* | 12/2014 | Hattori | H04N 21/4532 725/45 |
| 2015/0186947 | A1* | 7/2015 | Huang | G06Q 30/0269 705/14.66 |
| 2015/0312652 | A1* | 10/2015 | Baker | H04N 21/8549 386/281 |

* cited by examiner

600

```
…
Initialization Subroutine
…
//Routine to identify media assets:

 Receive instances of a user ratings of portions of a first media asset
 For each instance of a first user rating and a second user rating:
   A = Accessed value of a first user rating
   B = Accessed value of a second user rating
   Execute subroutine to identify a property of the first media asset based on first
  metadata and second metadata
        If (A<=B)
              Execute Subroutine to identify second media asset that is not
  associated with the property of the first media asset using control circuitry
        Else
              Execute Subroutine to identify second media asset that is
  associated with the property of the first media asset using control circuitry
…
Termination Subroutine
…
```

Figure 8:
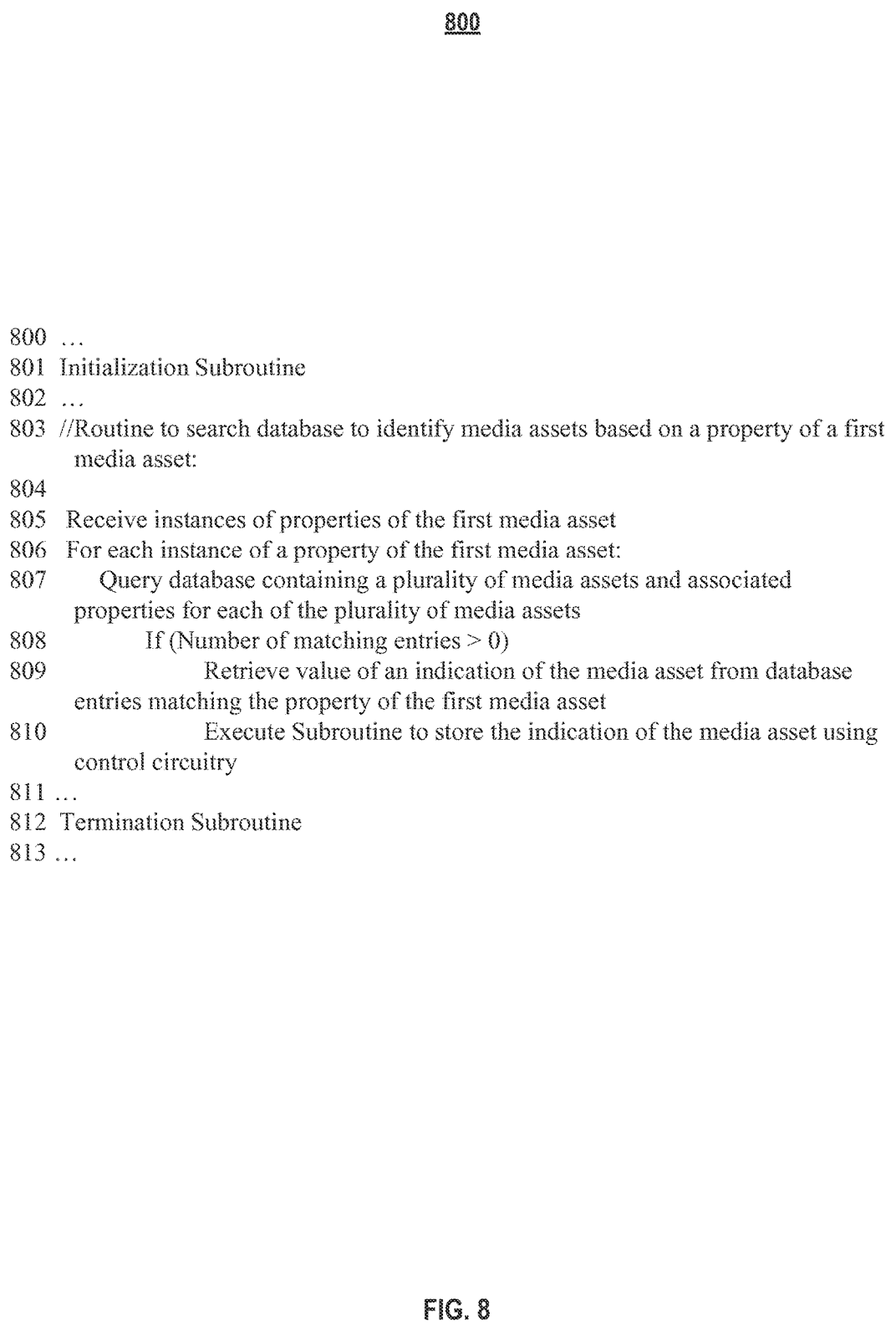

```
...
Initialization Subroutine
...
//Routine to search database to identify media assets based on a property of a first media asset:

Receive instances of properties of the first media asset
For each instance of a property of the first media asset:
    Query database containing a plurality of media assets and associated properties for each of the plurality of media assets
        If (Number of matching entries > 0)
            Retrieve value of an indication of the media asset from database entries matching the property of the first media asset
            Execute Subroutine to store the indication of the media asset using control circuitry
...
Termination Subroutine
...
```

| | 1002 User | 1004 Scene No. | 1006 Start | 1008 End | 1010 Genre | 1012 Plot Location | 1014 Parental Rating | 1016 Misc | 1018 User Rating |
|---|---|---|---|---|---|---|---|---|---|
| 1020 | Steve | 1 | 0:00 | 0:05 | Drama | Intro | PG | - | 5 |
| 1022 | Steve | 2 | 0:28 | 0:32 | Action | Intermediate | PG-13 | - | 9 |
| 1024 | Steve | 3 | 0:34 | 0:36 | Romance | Intermediate | R | - | 6 |
| 1026 | Steve | 4 | 1:24 | 1:25 | Comedy | Intermediate | PG | - | 7 |
| 1028 | Steve | 5 | 1:31 | 1:35 | Drama | Intermediate | PG-13 | Plot Twist | 10 |
| 1030 | Steve | 6 | 2:06 | 2:14 | Drama | Intermediate | PG | - | 2 |
| 1032 | Steve | 7 | 2:38 | 2:40 | Drama | Conclusion | PG-13 | - | 3 |
| 1034 | Steve | 8 | 2:42 | 2:45 | Drama | Conclusion | PG-13 | - | 1 |

FIG. 10

SCENE-BY-SCENE VIEWER RATINGS

BACKGROUND

Media guidance applications often provide opportunities for users to rate a media asset, either as they consume the media asset or after they have consumed the media asset. Such media guidance applications also may allow the user to rate individual scenes of the media asset separately. For example, a user who enjoys comedies may rate a comedic scene in a movie very highly, but may give a low rating to a later romantic scene in the same movie. In this manner, the media guidance application may track not only the user's overall impression of the media asset, but his or her interests and preferences as they change during the consumption of the media asset.

This information about the user may be used to drive media asset recommendations. For instance, a media guidance application may track which scenes a user rates highly and recommend related media assets with similar scenes. The accuracy of such media asset recommendations may be improved by not only deriving the user's preferences from the scene-level ratings, but also by tracking the pattern of user ratings as they change over the course of the duration of the media asset.

SUMMARY

Accordingly, systems and methods are described herein for identifying media assets based on user ratings. In some aspects, control circuitry may perform a method for identifying media assts. The control circuitry may receive a first user rating for a first portion of a first media asset, the first portion of the first media asset being associated with first metadata. The first user rating may be received at any relevant time, including before consumption of the media asset begins, during consumption of the media asset, or after consumption of the media asset. For example, in some embodiments, the user may use a user interface device to input the first user rating for a scene of the media asset while the user is watching the scene. In other instances, the user may use a user interface device to input the first user rating after the user has watched the scene. For example, the control circuitry may generate for display a list of scenes after the user consumes the entire media asset, and the user may input user ratings for any of the scenes that the user wishes.

The first portion of the media asset may be determined in any suitable manner. In some embodiments, the first portion of the first media asset may be a scene of the media asset. In some embodiments, a user may specify a first portion of the first media asset by defining a start time and an end time. In some embodiments, the first portion of the first media asset may be pre-defined, for example by a content provider. For instance, a content provider may provide access to the media asset with scene identifiers which identify a start time and an end time of the first portion of the media asset. It will be understood that the first media asset may contain either user-defined portions, pre-defined portions, or a combination of the two.

The first portion of the media asset may be associated with first metadata. The first metadata may include any information that describes the content of the first portion of the media asset or information that relates to the first portion of the media asset. In some embodiments, the first metadata may comprise at least one of the following: a start time of an associated scene, an end time of an associated scene, an indication that an associated scene is an introduction scene, intermediate scene, a concluding scene, a plot twist, a buildup of the first media asset, a genre, a content tag, or a parental rating. The metadata may be received in any suitable manner. In some embodiments, the first metadata is received with the first media asset. For instance, the first metadata may be transmitted at the same time as the first media asset. In some embodiments, the first metadata may be transmitted or streamed at the same time as the first portion of the first media asset. In some embodiments, the first metadata may be transmitted before a user consumes the first portion of the first media asset. In some embodiments, the first metadata may be transmitted after a user consumes the first portion of the first media asset. In some embodiments, the first metadata may be received in response to a request from the user. For example, the user may request additional information about a scene, either while watching the scene or after watching the scene, and in response to the user's request, a content provider may transmit the first metadata associated with the first scene.

The control circuitry may receive a second user rating for a second portion of a first media asset, the second portion of the second media asset being associated with second metadata. The second portion of the first media asset may be different than the first portion of the first media asset. For example, the first portion may be a first scene in a movie, and the second portion may be a second, later scene in the same movie. As with the first user rating, the second user rating may be received at any relevant time, including before consumption of the media asset begins, during consumption of the media asset, or after consumption of the media asset. For example, in some embodiments, the user may use a user interface device to input the second user rating for a scene of the media asset while the user is watching the scene. In other instances, the user may use a user interface device to input the second user rating after the user has watched the scene. For example, the control circuitry may generate for display a list of scenes after the user consumes the entire media asset, and the user may input user ratings for any of the scenes that the user wishes. Although the systems and methods described herein are described in relation to audio/visual media, it will be understood that the systems and methods described herein apply to any type of media asset, including, but not limited to, visual, audio, and audio-visual media assets.

As with the first portion, the second portion of the media asset may be determined in any suitable manner. In some embodiments, the second portion of the first media asset may be a scene of the media asset. In some embodiments, a user may specify a second portion of the first media asset by defining a start time and an end time. In some embodiments, the second portion of the first media asset may be pre-defined, for example by a content provider. For instance, a content provider may provide access to the media asset with scene identifiers which identify a start time and an end time of the second portion of the media asset.

The second portion of the media asset may be associated with second metadata. The second metadata may include any information that describes the content of the second portion of the media asset or information that relates to the second portion of the media asset. In some embodiments, the second metadata may comprise at least one of the following: a start time of an associated scene, an end time of an associated scene, an indication that an associated scene is an introduction scene, intermediate scene, a concluding scene, a plot twist, a buildup of the first media asset, a genre, a content tag, or a parental rating. The metadata may be received in any suitable manner. In some embodiments, the second metadata is received with the first media asset. For instance, the second metadata may be transmitted at the same time as the first media asset. In some embodiments, the second metadata may be transmitted or streamed at the same time as the second portion of the first media asset. In some embodiments, the second metadata may be transmitted before a user consumes the second portion of the first media asset. In some embodiments, the second metadata may be transmitted after a user consumes the second portion of the first media asset. In some embodiments, the second metadata may be received in response to a request from the user. For example, the user may request additional information about a scene, either while watching the scene or after watching the scene, and in response to the user's request, a content provider may transmit the second metadata associated with the first scene.

The control circuitry may determine whether the second user rating is higher than the first user rating. The user ratings may comprise any suitable measure for quantifying the user's interest, preference, or desire for the associated portion of the first media asset. In some embodiments, the user rating may be a numerical rating. For example, the user may rate a scene of a movie a minimum of 0 (extremely dislike) to a maximum of 5 (extremely like). In some embodiments, the user rating may be discrete indicators. For instance, the user rating may comprise 0 to three stars. Other examples of user ratings will be understood by those of skill in the art. The control circuitry may determine that the second user rating is higher than the first user rating using any suitable method for logically comparing the first user rating and the second user rating, as will be understood by those of skill in the art.

The control circuitry may determine a property of the first media asset based on the first metadata and the second metadata. The property of the first media asset may comprise any information about the content of the first media asset or information that describes the first media asset. For example, in some embodiments, the property of the first media asset comprises one of: an indication that the first media asset is a long media asset, an indication that the first media asset is a short media asset, an indication that the first media asset has at least one turning point, and a genre of the first media asset. The control circuitry may determine the property of the first media asset in any suitable manner. For example, the control circuitry may determine that a movie is a comedy because one or both of the first metadata or the second metadata indicates that an associated scene of the movie is a comedy. As another illustrative example, the first and the second metadata may comprise start time information of the associated scene. The control circuitry may determine an average duration of similar media assets to the first media assets. In response to determining that the time duration between the first portion of the media asset and the second portion of the media asset is greater than the average duration of similar media assets, the control circuitry may determine that the first media asset is a long media asset. Conversely, in response to determining that the time duration between the first portion of the media asset and the second portion of the media asset is less than the average duration of similar media assets, the control circuitry may determine that the first media asset is a short media asset. The control circuitry may also determine whether the first media asset is a long/short media asset based on the overall start and end times of the first media asset. As another illustrative example, the control circuitry may determine that the first media asset is an "exciting" media asset because at least one of the first and the second metadata indicates that an associated scene is a turning point. In some embodiments, the indication that the associated scene is a turning point may be provided by a content provider. In some embodiments, the indication that the associated scene is a turning point may be provided by another user.

In response to determining that the second user rating is lower than the first user rating, the control circuitry may identify a second media asset that is not associated with the property of the first media asset. For example, the second user rating may be associated with a scene that is later than a scene associated with the first user rating. The control circuitry may determine that the media asset is a long media asset (that is, has the property "long duration"), and that the user has rated a second scene lower than a prior first scene. In response to this determination, the control circuitry may identify a second media asset that is not associated with the "long duration" property. In this example, the control circuitry may identify a second media asset with the property "short duration." In some embodiments, the control circuitry may identify a second media asset that has a shorter duration than the first media asset. In some embodiments, the control circuitry may determine that the first and second user ratings occur relatively early in a "long" media asset. In this case, the control circuitry may identify a second media asset that has a shorter duration that the first media asset.

In response to determining that the second user rating is higher than the first user rating, the control circuitry may identify a second media asset that is associated with the property of the first media asset. For example, the second user rating may be associated with a scene that is later than a scene associated with the first user rating. The control circuitry may determine that the media asset is a long media asset (that is, has the property "long duration"), and that the user has rated a second scene higher than a prior first scene. In response to this determination, the control circuitry may identify a second media asset that is associated with the "long duration" property. In this example, the control circuitry may identify a second media asset with the property "long duration." In some embodiments, the control circuitry may identify a second media asset that has a longer duration than the first media asset.

In some embodiments, the control circuitry may receive a third user rating for a third portion of the first media asset, the third portion of the first media asset being associated with third metadata, and wherein the third portion is different than the first portion and the second portion. The control circuitry may analyze a pattern of user ratings that occurs among the first user rating, the second user rating, and the third user rating. For example, the control circuitry may determine that the first user rating is higher than the second and third user ratings, that the second user rating is higher than the first and third user ratings, that the third user rating is higher than the first and second user ratings, or any other combination. The control circuitry may further determine the property of the first media asset based on the third metadata. For example, the user may have given a first scene in a movie a low rating, given a second later scene an extremely high rating, and given a third later scene another low rating. In this example, the control circuitry may determine that the movie has an exciting point and/or a turning point, and assign a property of "plot twist" to the movie. In some embodiments, the property of "plot twist" may be associated with the movie by a content provider. In another illustrative example, the middle scene may be rated lower than the first and the third scene. In this example, the control circuitry may determine that the movie moves slowly or has some plot development in the middle, and assign a property to the movie appropriately. Since some users may prefer fast-paced movies with less lulls in the plot, this property may become useful to avoid recommending the movie to such users.

In some embodiments, the control circuitry may identify a second media asset by matching a pattern of user ratings of portions of the first media asset with another pattern of user ratings of portions of the second media asset. For example, the first media asset may have user ratings for a first scene and a second, later scene, where the second scene is rated higher than the first scene. The control circuitry may identify a second media asset that also has a user rating for a second scene that is higher than the rating for a first scene in the second media asset. As another illustrative example, the first media asset may have a first, second, and a third user rating, wherein the second user rating is higher than the first and third user rating. In this example, the control circuitry may identify a second media asset that also has a first, second, and a third user rating wherein the second user rating is higher than the first and third user rating. As another illustrative example, the control circuitry may determine that a first media asset is associated with a first, second, and a third user rating, wherein the second user rating is lower than the first and the third user rating. This may indicate that the user does not prefer slow-moving media assets and may prefer a more fast-paced media asset. In such a case, the control circuitry may identify a second media asset that is associated with a property that identifies the second media asset as including a plot twist.

In some embodiments, the first metadata may comprise genre information regarding the first portion of the first media asset, and the control circuitry may identify the second media asset by comparing the first metadata to metadata associated with the second media asset. The control circuitry may identify the second media asset by determining that the first metadata matches the metadata associated with the second media asset. For example, the first metadata may indicate the a first scene in a movie is a comedic scene. In this example, the control circuitry may identify a second media asset that is associated with metadata that identifies it as a comedy.

In some embodiments, the control circuitry may generate a display of a listing of the second media asset. For example, the control circuitry may display a listing of the second media asset as part of a media recommendations screen. The media recommendations screen may be displayed in response to a request from the user, or automatically without input from the user. For instance, the user may request additional information about a first media asset, including media assets that are relevant to the first media asset. In response, the control circuitry may generate for display a listing of the second media asset. In another example, the control circuitry may generate for display the listing for the second media asset as part of a home screen of a media guidance application.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 shows illustrative pseudocode for an algorithm for control circuitry to identify media assets in accordance with some embodiments of the disclosure;

FIG. 8 shows illustrative pseudocode for an algorithm for control circuitry to identify media assets in accordance with some embodiments of the disclosure;

FIG. 10 shows an illustrative database entry for a media asset in accordance with some embodiments of the disclosure.

DESCRIPTION

Figure 1:
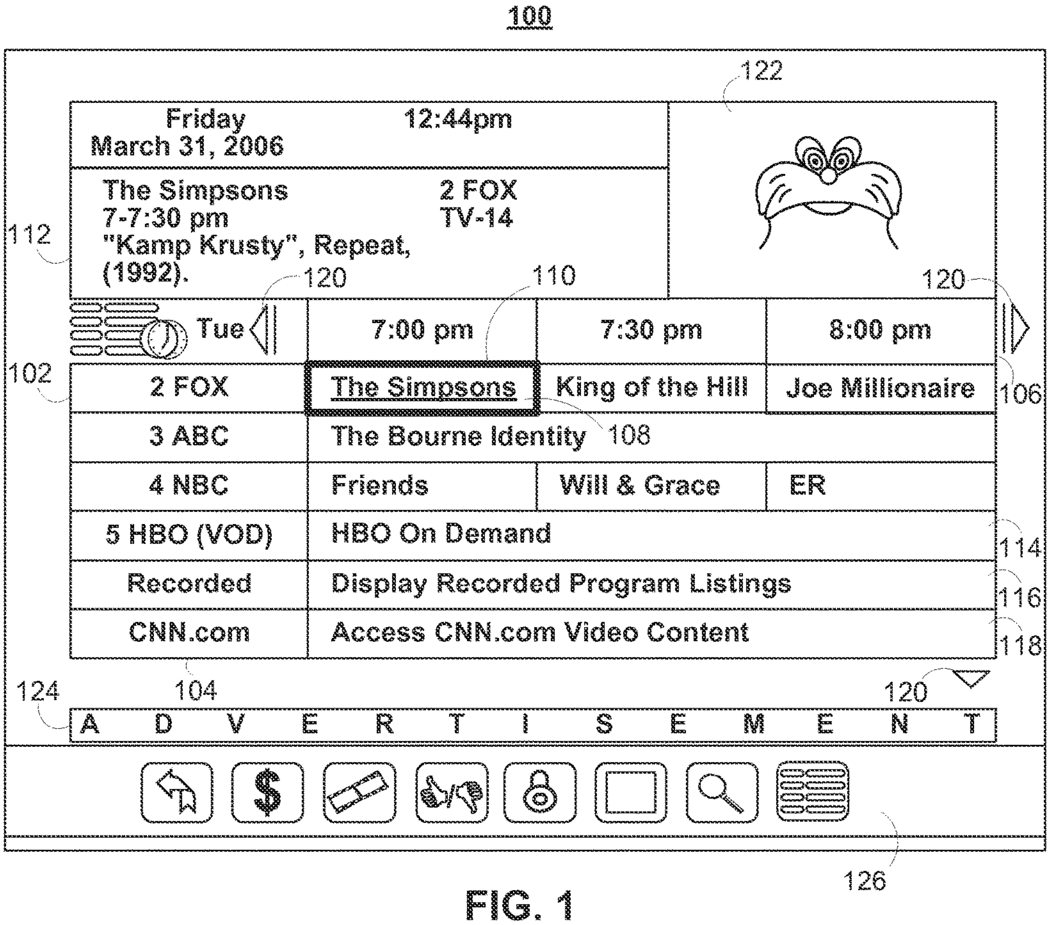
FIG. 1 shows an illustrative example of a display screen for use in accessing media content in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
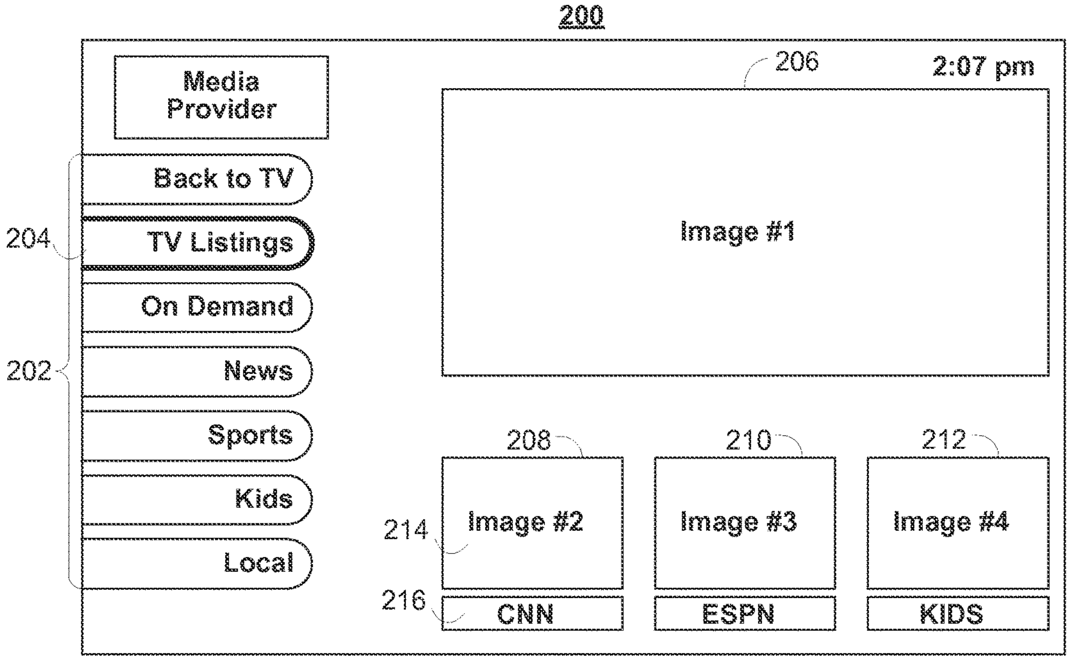
FIG. 2 shows another illustrative example of a display screen used access media content in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
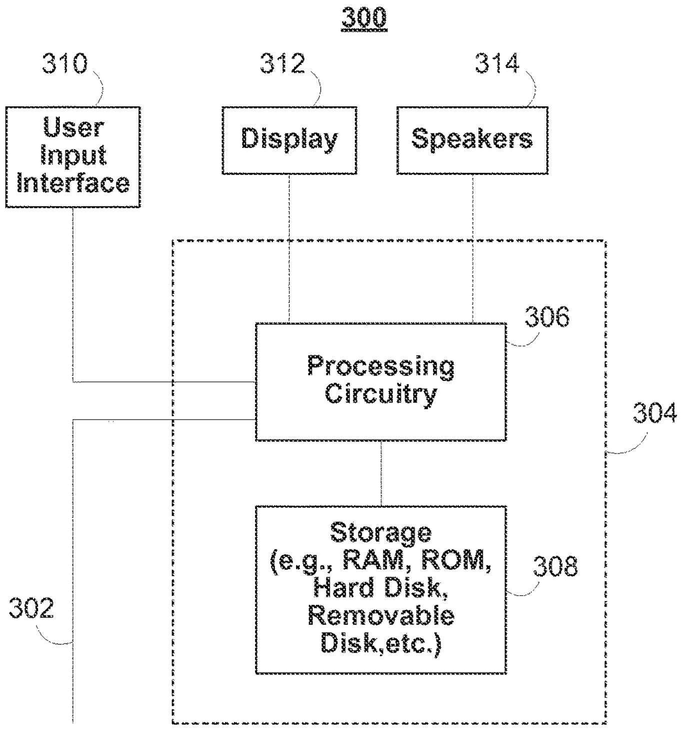
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. For example, storage 308 may be configured to store identifications of user-defined portions of media assets (for example, start and end times of portions of media assets), identifications of portions of media assets provided by a content provider, and user ratings for portions of media assets. Storage 308 may also store identifications of media assets that have been identified based on the stored user ratings. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
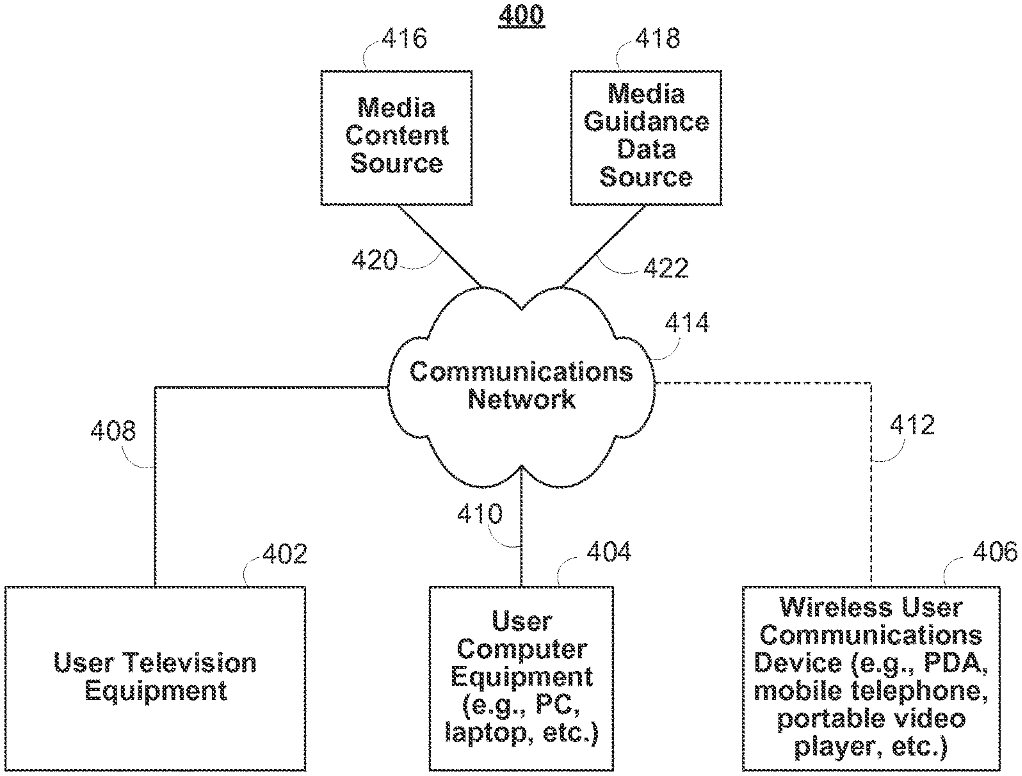
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. For example, media guidance data source 418 may store a database comprising a plurality of media assets, each media asset associated with one or more properties. Upon request, media guidance data source 418 may access the database and transmit a list of the plurality of media assets or a subset of media assets. Media guidance data source 418 may also search the database for one or more media assets that are associated with a particular property. For example, the media guidance data source 418 may be configured to return a list of only "long" media assets (that is, media assets associated with the property "long duration").

Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

Figure 5:
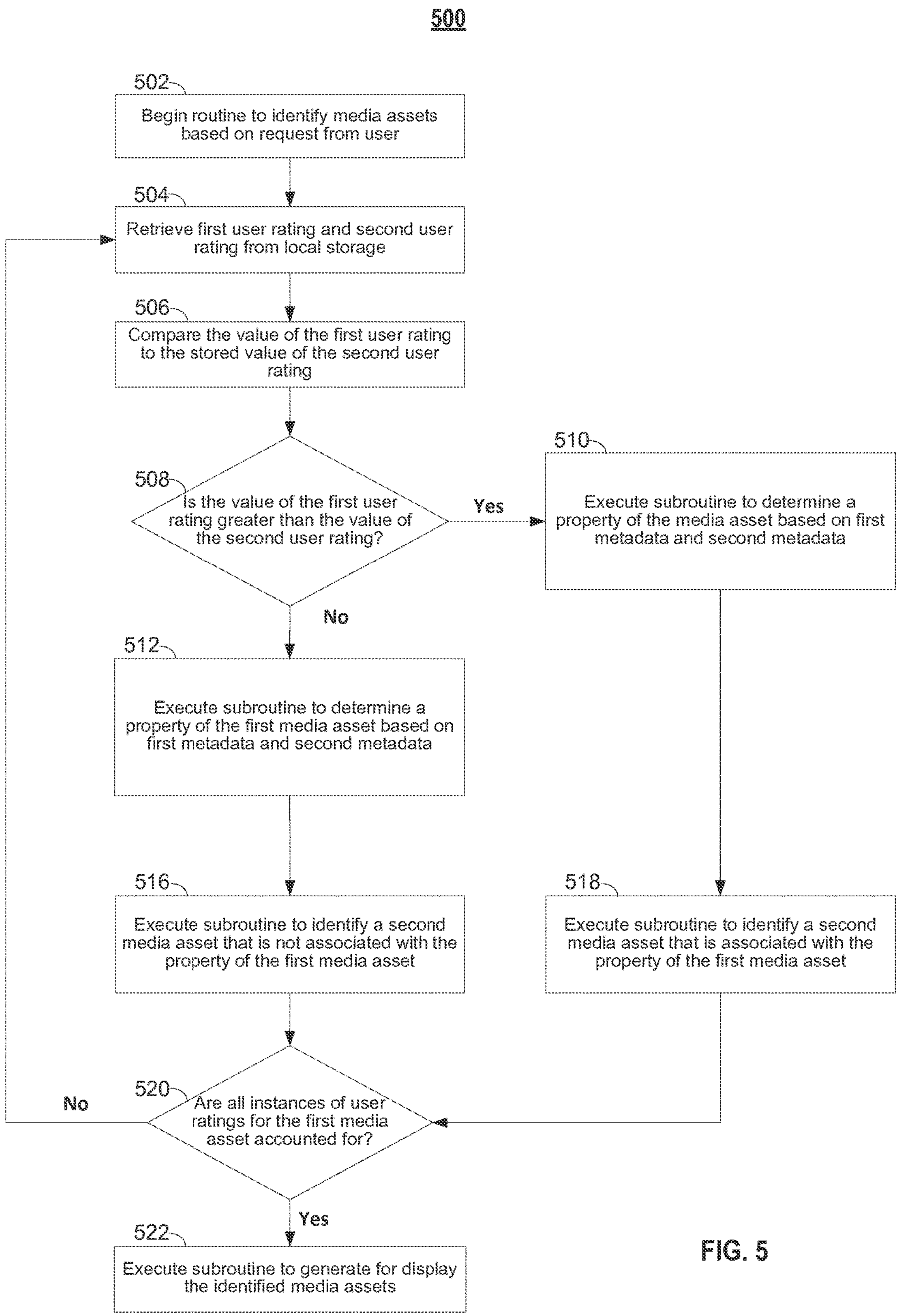
FIG. 5 is a flowchart that describes an algorithm for control circuitry to identify media assets in accordance with some embodiments of the disclosure.

FIGS. 5 and 6 present an algorithm for control circuitry (e.g., control circuitry 304) to identify media assets in accordance with some embodiments of the disclosure. In some embodiments this algorithm may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 5 describes an algorithm for control circuitry (e.g., control circuitry 304) to identify media assets in accordance with some embodiments of the disclosure.

At 502, the algorithm to identify media assets will begin based on a request from the user. In some embodiments, this may be done either directly or indirectly in response to a user action or input (e.g., from signals received by control circuitry 304 or user input interface 310). For example, the algorithm may begin directly in response to control circuitry 304 receiving signals from user input interface 310, or control circuitry 304 may prompt the user to confirm their input using a display (e.g., by generating a prompt to be displayed on display 312) prior to running the algorithm.

At 504, control circuitry 304 proceeds to retrieve a first user rating and a second user rating from local storage (for example, storage 308 depicted in FIG. 3). The first user rating may correspond to a first portion of a first media asset, such as a scene. The second user rating may correspond to a second portion of the first media asset, and the second portion may be a different portion than the first portion. As an illustrative example, the user may have provided a rating for a first scene in a movie and another rating for a second scene in a movie. In some embodiments control circuitry 304 may receive a single primitive data structure that represents the value of the first user rating and the second user rating. In some embodiments the value may be stored as part of a larger data structure, and control circuitry 304 may retrieve the value by executing appropriate accessor methods to retrieve the value from the larger data structure.

At 506, control circuitry 304 proceeds to compare the value of the first user rating to the stored value of the second user rating. In some embodiments, the value of the second user rating may be stored (e.g., on storage device 308) prior to beginning the algorithm. In some embodiments the value of the second user rating may also be retrieved for each and every instance of the first user rating, and the value of the second user rating may change from iteration to iteration. In some embodiments, control circuitry 304 may directly compare the value of the second user rating with the value of the first user rating by accessing the values respectively from memory and performing a value comparison. In some instances, control circuitry 304 may call a comparison function (e.g., for object to object comparison) to compare the first user rating and the second user rating.

At 508, control circuitry 304 compares the values of the first user rating and the second user rating to determine if the value of the first user rating is greater than the value of second user rating. If the condition is satisfied, the algorithm may proceed to 510; if the condition is not satisfied, the algorithm may proceed to 512 instead.

At 510, control circuitry 304 will execute a subroutine to determine a property of the media asset based on first metadata and second metadata. The property of the media asset may comprise any information about the content of the media asset or information that describes the media asset. For example, in some embodiments, the property of the media asset comprises one of: an indication that the media asset is a long media asset, an indication that the media asset is a short media asset, an indication that the media asset has at least one turning point, and a genre of the media asset. The first metadata and second metadata may be associated with respective first and second portions of the media asset, which are, in turn, associated respectively with the first and second user ratings. The first and second metadata may include any information that describes the content of the respective portion of the media asset or information that relates to the respective portion of the media asset. In some embodiments, the first and/or second metadata may comprise at least one of the following: a start time of an associated scene, an end time of an associated scene, an indication that an associated scene is an introduction scene, intermediate scene, a concluding scene, a plot twist, a buildup of the first media asset, a genre, a content tag, or a parental rating. After the subroutine is executed, the algorithm may execute a subroutine at 518 to identify a second media asset that is associated with the property of the first media asset. At 520, the algorithm determines if all instances of user ratings are accounted for and if further iterations are needed.

At 512, control circuitry 304 will execute a subroutine to determine a property of the first media asset based on the first metadata and second metadata. Step 512 may be substantially similar to step 510. At 516, the control circuitry 304 will execute a subroutine to identify a second media asset that is not associated with the property of the first media asset. After the subroutine is executed, the algorithm may proceed to 520 where it is determined if all instances of user ratings are accounted for and if further iterations are needed. If further iterations are required, the control circuitry 304 may return to 504. If no further iterations are required, the control circuitry 304 will, at 522, execute a subroutine to generate for display the identified media assets.

It is contemplated that the descriptions of FIG. 5 may be used with any other embodiment of this disclosure. In addition, the descriptions described in relation to the algorithm of FIG. 5 may be done in alternative orders or in parallel to further the purposes of this disclosure. For example, conditional statements and logical evaluations, such as those at 508 and 520, may be performed in any order or in parallel or simultaneously to reduce lag or increase the speed of the system or method. As a further example, in some embodiments several instances of user ratings may be evaluated in parallel, using multiple logical processor threads, or the algorithm may be enhanced by incorporating branch prediction. Furthermore, it should be noted that the algorithm of FIG. 5 may be implemented on a combination of appropriately configured software and hardware, and that any of the devices or equipment discussed in relation to FIGS. 3-4 could be used to implement one or more portions of the algorithm.

The pseudocode in FIG. 6 describes an algorithm to identify media assets in accordance with some embodiments of the disclosure. It will be evident to one skilled in the art that the algorithm described by the pseudocode in FIG. 6 may be implemented in any number of programming languages and a variety of different hardware, and that the style and format should not be construed as limiting, but rather a general template of the steps and procedures that would be consistent with code used to implement some embodiments of this disclosure.

At line 601, the algorithm may run a subroutine to initialize variables and prepare to identify media assets, which begins on line 605. For example, in some embodiments control circuitry 304 may copy instructions from non-transitory storage medium (e.g., storage device 308) into RAM or into the cache for processing circuitry 306 during the initialization stage. Additionally, in some embodiments the value of user ratings being used for comparison, or a tolerance level for determining if two values are essentially equivalent, may be retrieved, set, and stored at 601.

At line 605, control circuitry 304 may receive instances of user ratings of portions of a first media asset. In some embodiments these instances may be retrieved from local storage, such as storage 308 depicted in FIG. 3. Control circuitry 304 may receive instances of user ratings by receiving, for example, a pointer to an array of values of user ratings. In another example, control circuitry 304 may receive an object of a class, such as an iterator object containing elements of user ratings.

At line 606, control circuitry 304 may iterate through the various instances of user ratings. If only a single instance is available, the loop will only execute once. This loop may be implemented in multiple fashions depending on the choice of hardware and software language used to implement the algorithm of FIG. 6; for example, this may be implemented as part of a "for" or "while" loop.

At line 607, control circuitry 304 will store the value of a first user rating into a temporary variable "A." In some embodiments the value of the first user rating will be stored as part of a larger data structure or class, and the value of the first user rating may be obtained through appropriate accessor methods. In some embodiments the first user rating may be converted from a string or other non-numeric data type into a numeric data type by means of an appropriate hashing algorithm. In some embodiments, control circuitry 304 may call a function to perform a comparison of the first user rating to a second user rating. In some embodiments the first user rating may be encoded as a primitive data structure, and rather than using a temporary variable, the first user rating may be directly used in the comparisons at line 610.

At line 608, control circuitry 304 will store the value of a second user rating into a temporary variable "B." Similar to the first user rating, in some embodiments the value of the second user rating will be stored as part of a larger data structure or class, and the value of the second user rating may be obtained through accessor methods. In some embodiments the second user rating may be converted from a string or other non-numeric data type into a numeric data type by means of an appropriate hashing algorithm, or the second user rating may be a primitive data structure, and may be directly used in the comparisons at lines 609 and 611.

At line 610, control circuitry 304 compares the value of A to the value of B to see if A is less than or equal to B.

If A is less than or equal to B, the control circuitry 304 will, at line 611, execute a subroutine to identify a second media asset that is not associated with the property of the first media asset.

At line 613, control circuitry 304 will execute a subroutine to identify a second media asset that is associated with the property of the first media asset if A is greater than B.

At line 615, control circuitry 304 may run a termination subroutine after the algorithm has performed its function. For example, in some embodiments control circuitry 304 may destruct variables, perform garbage collection, free memory or clear the cache of processing circuitry 306.

It will be evident to one skilled in the art that the algorithm described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after line 610 to speed operation, or the conditional statements may be replaced with a case-switch. In some embodiments, rather than iterating over all instances of user ratings at 606, in some embodiments the code may be rewritten so control circuitry 304 is instructed to evaluate multiple instances of user ratings simultaneously on a plurality of processors or processor threads, lowering the number of iterations needed and potentially speeding up computation time.

Figure 7:
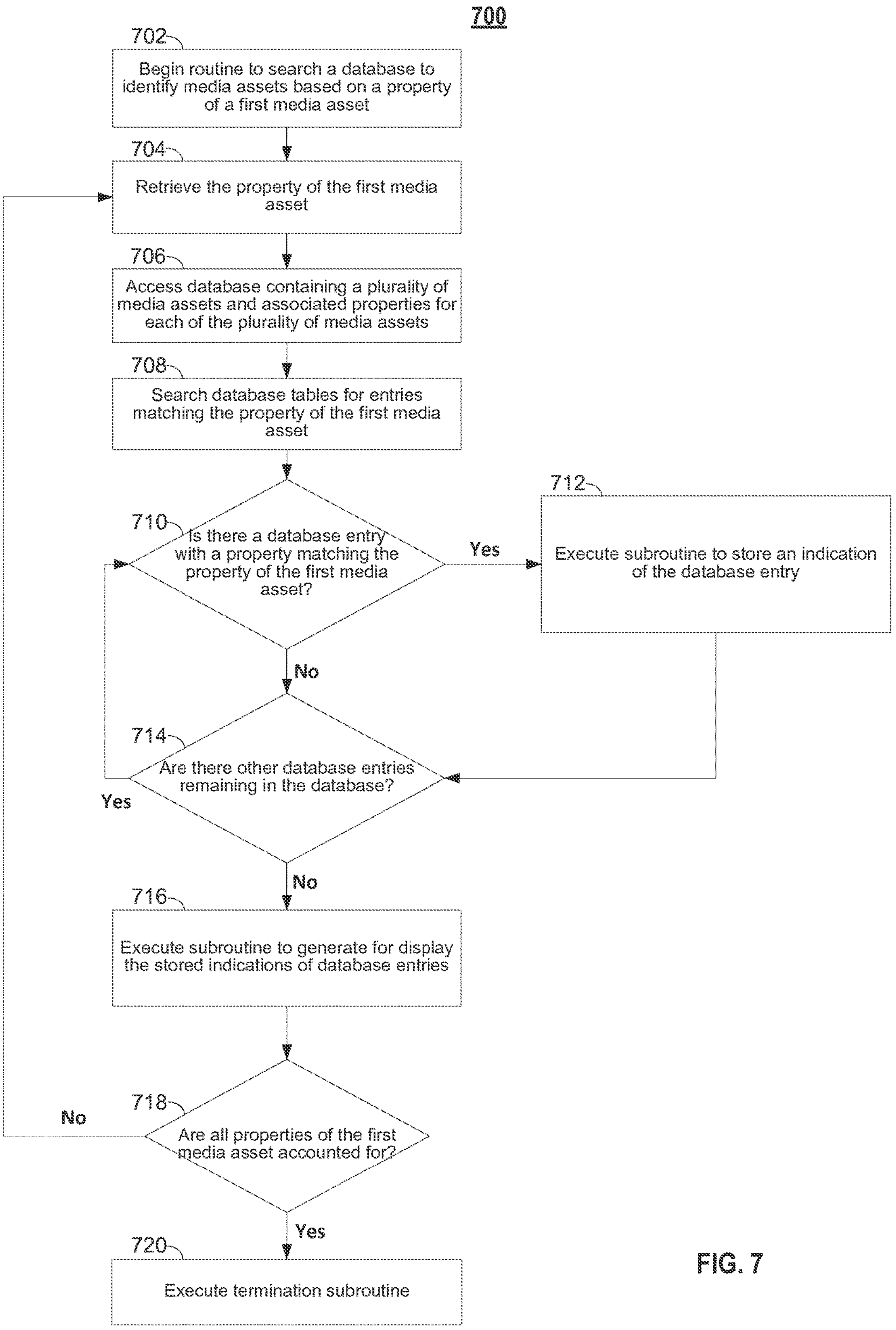
FIG. 7 is a flowchart that describes an algorithm for control circuitry to identify media assets in accordance with some embodiments of the disclosure.

FIGS. 7 and 8 present an algorithm for control circuitry (e.g., control circuitry 304) to search a database to identify media assets based on a property of a first media asset using a database containing a plurality of media assets in accordance with some embodiments of the disclosure. The first media asset, first and second metadata, and first and second portions of the first media asset, may be substantially similar to those described above in relation to FIGS. 5 and 6. Similar to the algorithms described by FIGS. 5 and 6, in some embodiments this algorithm may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 7 describes an algorithm for control circuitry (e.g., control circuitry 304) to search a database and identify media assets based on a property of a first media asset in accordance with some embodiments of the disclosure.

At 702, the algorithm to search a database and identify media assets based on a property of a first media asset will begin. In some embodiments, the algorithm will trigger based on receipt of one or more user ratings. In some embodiments, the algorithm may be done either directly or indirectly in response to a user action or input (e.g., from signals received by control circuitry 304 or user input interface 310.)

At 704, control circuitry 304 proceeds to retrieve the property of the first media asset. In some embodiments control circuitry 304 may retrieve a single primitive data structure that represents the value of the property of the media asset. In some embodiments control circuitry 304 may retrieve the value from a larger class or data structure.

At 706, control circuitry 304 accesses a database containing a plurality of media assets and associated properties for each of the plurality of media assets. In some embodiments, this database may be stored locally (e.g., on storage device 308) prior to beginning the algorithm. In some embodiments the database may also be accessed by using communications circuitry to transmit information across a communications network (e.g., communications network 414) to a database implemented on a remote storage device (e.g., media guidance data source 418).

At 708, control circuitry 304 searches database tables for entries matching the property of the first media asset. In some embodiments this may be done by comparing an identifier, for example a string or integer representing the property of the first media asset, that matches the types of identifiers used inside the database. In some embodiments control circuitry 304 may submit a general query to the database for table entries matching the property of the first media asset, and control circuitry 304 may receive a list of indices or a data structure containing a portion of the database contents. In some embodiments the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the algorithm of FIG. 7 may be implemented using multiple independent or cross-referenced databases.

At 710, control circuitry 304 may determine if there are database entries with properties matching the property of the first media asset. In some embodiments control circuitry 304 may receive a signal from the database indicating that there are no matching entries. In some embodiments control circuitry 304 may instead receive a list of indices or data structures with a NULL or dummy value. If control circuitry 304 identifies that there are database entries matching the property of the first media asset the algorithm proceeds to 712, otherwise the algorithm proceeds to 714.

At 712, control circuitry 304 will execute a subroutine to store an indication of the database entry. For example, the control circuitry 304 may store a program listing associated with the matching database entry. Afterwards, the algorithm may proceed to 714 where it is determined if there are further database entries remaining in the database.

At 714, control circuitry 304 may determine if there are other database entries remaining in the database. If there are other database entries, the control circuitry 304 will return to 710. If all database entries have been accounted for, the control circuitry 304 will continue to 716.

At 716, control circuitry 304 will execute a subroutine to generate for display the stored indications of database entries. For example, the control circuitry 304 may generate for display program listings associated with the matching database entries as part of a media recommendations screen. Afterwards, the algorithm may proceed to 718.

At 718, control circuitry 304 will determine whether all properties of the first media asset are accounted for and if further iterations are needed. If further iterations are needed the algorithm will loop back to 704 where control circuitry 304 will retrieve the next instance of the property of the first media asset. If no further iterations are needed the algorithm will terminate at 720.

It is contemplated that the descriptions of FIG. 7 may be used with any other embodiment of this disclosure. In addition, the descriptions described in relation to the algorithm of FIG. 7 may be done in alternative orders or in parallel to further the purposes of this disclosure. For example, control circuitry 304 may submit multiple queries to the database in parallel, or it may submit multiple queries to a plurality of similar databases in order to reduce lag and speed the execution of the algorithm. To further this purpose, in some embodiments 710 and 714 may be performed in parallel by control circuitry 304. Furthermore, it should be noted that the algorithm of FIG. 7 may be implemented on a combination of appropriately configured software and hardware, and that any of the devices or equipment discussed in relation to FIGS. 3-4 could be used to implement one or more portions of the algorithm.

The pseudocode in FIG. 8 describes an algorithm to identify media assets based on a property of a first media asset in accordance with some embodiments of the disclosure. It will be evident to one skilled in the art that the algorithm described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, the algorithm may run a subroutine to initialize variables and prepare to search a database to identify media assets based on a property of a first media asset, which begins on line 805. For example, in some embodiments control circuitry 304 may copy instructions from non-transitory storage medium (e.g., storage device 308) into RAM or into the cache for processing circuitry 306 during the initialization stage.

At line 805, control circuitry 304 may receive instances of a property of the first media asset. In some embodiments these instances may be retrieved from local storage, such as storage 308 depicted in FIG. 3.

At line 806, control circuitry 304 may iterate through the various instances of properties of the first media asset; if only a single instance is available, the loop will only execute once. This loop may be implemented in multiple fashions depending on the choice of hardware and software language used to implement the algorithm of FIG. 8; for example, this may be implemented as part of a "for" or "while" loop, in some programming languages. In some embodiments it may be convenient to store the instances of properties of the first media asset in a single class or encapsulated data structure that will perform the loop as part of an internal method.

At line 807, control circuitry 304 may query a database for entries matching the property of the first media asset. Depending on how the database is implemented and how the property of the first media asset is stored, an intermittent step may be required to convert the property of the first media asset into a form consistent with the database. For example, the property of the first media asset may encoded into a string or an integer using an appropriate hashing algorithm prior to being transmitted to the database by control circuitry 304 as part of a query. In some embodiments the property of the first media asset may be encoded as a primitive data structure, and control circuitry 304 may submit the property of the first media asset as a query to the database directly. After querying the database, control circuitry 304 may receive a set of database entries matching the property of the first media asset. In some embodiments control circuitry 304 may receive these entries in the form of a data-structure, a set of indices of the database, or a set of indices of another cross-referenced database.

At line 808, control circuitry 304 will determine if there are any database entries matching the property of the first media asset. In some embodiments control circuitry 304 may determine this by checking if the database returned an empty data structure or a NULL value in response to the query in line 807. If there are matching database entries the algorithm may proceed to line 809. If there were no matching database entries the algorithm may instead proceed to line 812.

At line 809, control circuitry 304 may retrieve one or more values of an indication of a media asset from the database entries matching the property of the first media asset. For example, if control circuitry 304 retrieves a list of indices after querying the database in line 807, in some embodiments control circuitry 304 may retrieve the database entries for media asset indicators located at the received indices. In some embodiments the indices may point to a larger data structure contained within the database, and control circuitry 304 may retrieve the values of media asset indicators from within the data structure using appropriate accessor methods. In some embodiments control circuitry 304 may retrieve the values of media asset indicators and store them in a separate data structure locally (e.g., in storage 308) prior to proceeding further. After retrieving the values of media asset indicators the algorithm will proceed to line 810.

At line 810, control circuitry 304 will execute a subroutine to store the indication of the media assets, for example in storage 308 depicted in FIG. 3. Afterwards, the algorithm may terminate at line 812.

At line 812, control circuitry 304 may execute a termination subroutine after the algorithm has performed its function and all instances of properties of the first media asset have been processed and checked against the database. For example, in some embodiments control circuitry 304 may destruct variables, perform garbage collection, free memory or clear the cache of processing circuitry 306.

It will be evident to one skilled in the art that the algorithm described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be re-written so control circuitry 304 is instructed to evaluate multiple instances of properties of the first media asset and submit multiple database queries simultaneously using a plurality of processors or processor threads. It is also understood that although we may describe control circuitry 304 interacting with a single database, this is only a single embodiment described for illustrative purposes, and the algorithm of FIG. 8. may be implement using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on demand.

Figure 9:
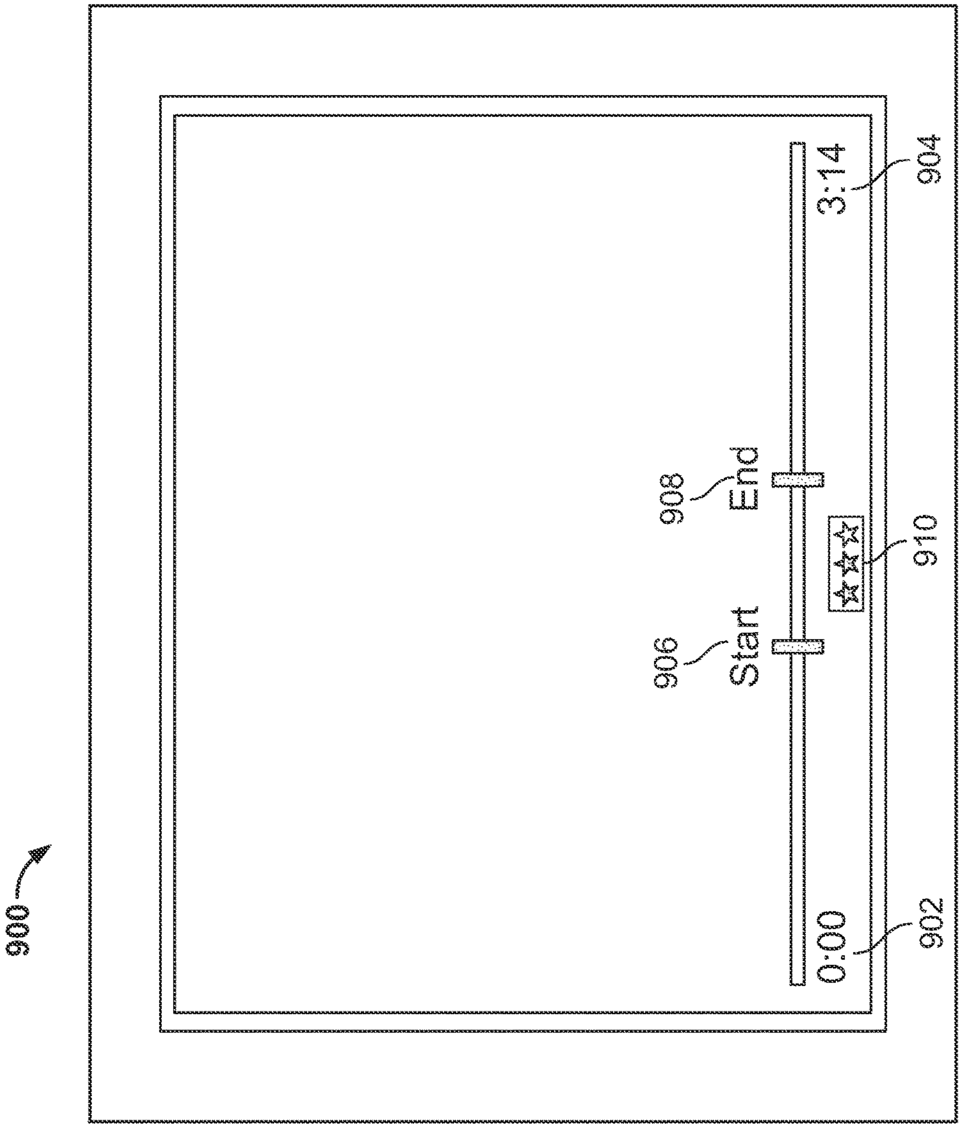
FIG. 9 shows an illustrative media guidance screen in accordance with some embodiments of the disclosure.

FIG. 9 shows an illustrative media guidance screen 900 in accordance with some embodiments of the disclosure. Media guidance screen 900 may be generated by control circuitry 304 for display on user equipment (for example, user equipment 402, 404, and/or 406). In some embodiments, the media guidance screen 900 may be generated as part of a media guidance application. For example, the media guidance screen 900 may be displayed as part of a media asset progress bar. In some embodiments, the media asset progress bar may be displayed while the user is consuming the media asset. In some embodiments, the media asset progress bar may be displayed before or after the user consumes the media asset.

Media guidance screen 900 includes a start time of the media asset 902, an end time of the media asset 904, a start time of the portion 906, and end time of the portion 908, and a user rating 910. Although the start and end times 902, 904, 906, and 908 are shown on a bar, such as a media asset progress bar, it will be understood that these start and end times 902, 904, 906, and 908 may be provided to the user in any suitable graphical format, including, text, visual components, or a combination of text and visual components. Furthermore, although the user rating 910 is shown in FIG. 9 as a three star maximum, it will be understood that any suitable method for receiving and displaying a user rating for the portion may be utilized.

In some embodiments, control circuitry 304 may receive user input (for example, through user input interface 310) for defining a portion of a media asset. For example, the media guidance screen 900 may be a progress bar that represents the duration of a media asset. The start time of the portion 906 and the end time of the portion 1008 may be user-selectable indicators that may be moved by the user to define the desired start and end times of the portion. In some embodiments, the user rating 910 will display automatically with a default rating. For example, the user rating 1010 may display automatically upon the user selecting a start time of the portion 906 and an end time of the portion 908. The user rating 910 may default to a minimum rating (for example, no stars) or a maximum rating (for example, three stars). In some embodiments, the user may define one or more of the start time of the portion 906, the end time of the portion 908, and the user rating 910 using a text input, or any other suitable user input interface.

FIG. 10 shows an illustrative database entry 1000 for a media asset in accordance with some embodiments of the disclosure. Database entry 1000 includes headers 1002-1018 and portion indicators 1020-1034. Each of the portion indicators 1020-1034 indicates a different portion of the media asset that is associated with a user rating. It will be understood that the headers 1002-1018 and portion indicators 1020-1034 are provided for illustrative purposes only, and that fewer or more headers and/or portions may be stored in database entry 1000. The database entry 1000 may be stored in any suitable memory. For example, the database entry 1000 may be stored in local storage (for example, storage 308) at any user equipment (for example, user equipment 402, 404, and/or 406). In some embodiments, the database entry 1000 may be stored remotely or on the cloud, for example at media guidance data source 418. Header 1002 describes the user that left the user rating for the respective portion. Although only one user ("Steve") is displayed in this column, it will be understood that multiple users may leave user ratings for a single media asset, and indications of these multiple users may be stored in header 1002. Header 1004 is an identifier of the portion of the media asset. In FIG. 10, the identifiers are numerical identifiers that increase incrementally for each user rating that is received. Other identifiers are contemplated, including text identifiers that briefly describe the content of the portion. Headers 1006 and 1008 describe the start and end time of the portion. As discussed above, the start and end times of the portion may be either defined by the user or provided by a content provider. Header 1010 describes the genre of the portion (for example, drama, action, romance, comedy, etc.). These genre indicators may be received from the user or provided by a content provider. For instance, the control circuitry 304 may generate for display, while a user is consuming a media asset, a selector that allows the user to input a genre associated with the portion. For example, the control circuitry 304 may generate for display a dropdown menu populated with pre-defined genre categories or may generate for display a text input area to allow the user to input a custom genre indication.

Header 1012 describes the general location of the portion with respect to the entire media asset (for example, introduction, intermediate, conclusion). As with the genre indicator in header 1010, the plot location may be received from the user or provided by a content provider. For instance, the control circuitry 304 may generate for display, while a user is consuming a media asset, a selector that allows the user to input a plot location associated with the portion. For example, the control circuitry 304 may generate for display a dropdown menu populated with pre-defined plot location categories or may generate for display a text input area to allow the user to input a custom plot location indication. In some embodiments, a content provider may provide time indices corresponding to various plot location categories. For example, the content provider may define the time indices 0:00-0:20 as an "introduction," 0:20-1:00 as "intermediate," and 1:00 to 1:27 as "conclusion." Other plot location categories are contemplated as will be understood by those of skill in the art.

Header 1014 indicates a parental rating for the portion. As with headers 1010 and 1012, the parental ratings in this column may be either input by the user or provided by a content provider. In some embodiments, a content provider will provide a parental rating for various portions o the media asset. In some embodiments, control circuitry 304 may generate for display a selector or text input area to allow a user to input their opinion of the parental rating for the scene. Although header 1014 is depicted as reflecting MPAA ratings, it will be understood that any type of parental rating indicator may be utilized, including indications of violence, language, and/or adult content.

Header 1016 indicates miscellaneous information about the portion. This miscellaneous information may be input by the user or provided by a content provider. For example, the control circuitry 304 may provide a selector or text input area while the user is consuming the media asset that allows the user to input notes about the portion. In some embodiments, a content provider may utilize header 1016 to indicate other aspects of media asset that are not covered in the other headers. For instance, a content provider may indicate that portion 1028 is a plot twist. In some embodiments, control circuitry 304 may search header 1016 for each of the entries 1020-1034 to determine whether the media asset contains a plot twist. The control circuitry 304 may then either recommend or not recommend the media asset for consumption to the user based on their preferences and/or user ratings for another media asset.

Header 1018 provides the user rating for the associated scene. As discussed above, the user rating may be any suitable measure for determining a user's interest, preference, or desire. The user ratings depicted in FIG. 10 are on a scale of 0 (bad) to 10 (good).

Control circuitry may analyze the user ratings 1018 received for the portions 1020-1034 to determine any patterns in the user ratings. For instance, the user ratings for the last three portions 1030, 1032, and 1034 are significantly lower than the first five user ratings. The media asset is also relatively long, at 2 hours and 45 minutes. This may indicate that the user does not like long movies. In response to determining that the user ratings are lower at the end of the media asset, the control circuitry 304 may identify another media asset that has a shorter duration than this media asset and recommend the other media asset to the user. As another illustrative example, the user rated scene 1028 very highly, with a maximum rating of 10. This scene is also indicated as a plot twist by header 1016. This may indicate that the user appreciates plot twists or turning points in media assets. In response to identifying that the user has rating a portion with a plot twist very highly, the control circuitry 304 may identify another media asset for recommendation to the user that also includes a portion with a plot twist. The control circuitry 304 may utilize thresholds to determine whether a portion was rated "high" or "low." For instance, the control circuitry 304 may determine that any portion that is rated a "7" or higher is rated "highly," and may infer that the user prefers that portion. The control circuitry 304 may also determine that any portion that is rated a "3" or lower is not rated highly, and may infer that the user does not prefer that portion. In some embodiments, the control circuitry 304 may store any preferences that are inferred from the user's ratings in a user profile. The control circuitry 304 may also augment any existing user profiles with the preferences that are inferred from the user's ratings.

Figure 11:
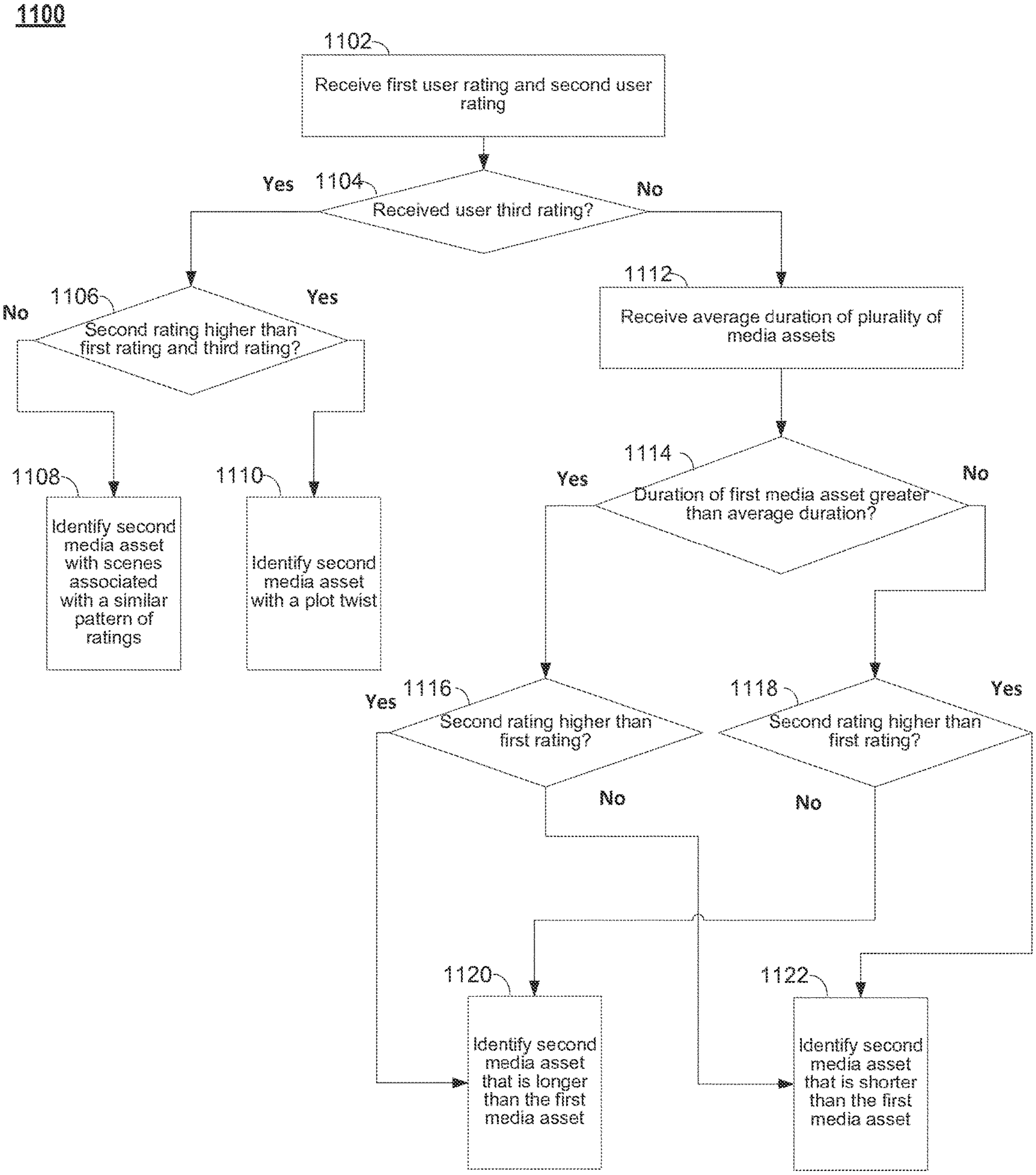
FIG. 11 is a flowchart for identifying media assets in accordance with some embodiments of the disclosure.

FIG. 11 is a flowchart 1100 for identifying media assets in accordance with some embodiments of the disclosure. At 1102, control circuitry 304 may receive a first user rating and a second user rating. The first user rating may correspond to a first portion of a first media asset, while the second user rating may correspond to a second portion of the first media asset that is different than the first portion. For example, the control circuitry 304 may receive, for each of the first and the second user rating, a user input using user input interface 310 that defines a portion start time (such as portion start time 906 depicted in FIG. 9) and a portion end time (such as portion end time 908 depicted in FIG. 9). The user may input the user rating for each respective portion, for instance, by using user input interface 310 to input user rating 910 in the media guidance screen depicted in FIG. 9. The control circuitry 304 may receive the first user rating and the second user rating from any suitable memory, such as storage 308 or media guidance data source 418. At 1104, control circuitry 304 may determine whether a third user rating corresponding to a third portion of the first media asset has been received. The third portion may be different than the first portion and the second portion. For example, the user may define yet a third portion using portion start time 906 and portion end time 908 on the media guidance screen depicted in FIG. 9 and input a user rating using the user rating 910. Indications of each of the portions and each of the user ratings may be stored as a database entry, such as database entry 1000 depicted in FIG. 10. As discussed above, the database entry may also include metadata associated with each of the portions. The metadata may either be supplied by the user (such as in the case of a user rating) or may be supplied by a remote source, such as a content provider. For example, a content provider may provide various information such as the start and end times 1006 and 1008 of the portion, a genre 1010 of the portion, a plot location 1012 of the portion, a parental rating 1014 of the portion, or miscellaneous information 1016 about the portion. In some embodiments, the metadata may comprise at least one of the following: a start time of an associated scene, an end time of an associated scene, an indication that an associated scene is an introduction scene, an intermediate scene, a concluding scene, a plot twist, or a buildup of the first media asset, a genre, a content tag, or a parental rating.

If the control circuitry 304 has received a third user rating, the control circuitry 304 may continue to 1106, where it determines whether the second rating is higher than the first rating and the third rating. If the second rating is not higher than the first rating and the third rating, then the control circuitry 304 may identify a second media asset with scenes associated with a similar pattern of ratings at 1108. In order to identify the second media asset, the control circuitry 304 may search a database of a plurality of media assets, each media asset being associated with user ratings for one or more portions of the respective media asset. The control circuitry 304 may search the database for media assets of the plurality of media assets that have a similar pattern of ratings as the first media asset. As an illustrative example, a user may give a low rating to an intermediate scene in a movie while giving relatively higher ratings to an introductory and concluding scene in the same movie. The control circuitry 304 may identify a second movie that is associated with a similar pattern of user ratings, wherein the middle of the movie is rated relatively lower than the introduction and conclusion. The user ratings associated with the second media asset may be from a different user or users than the first user. In some embodiments, the control circuitry 304 may query a remote database, such as media guidance data source 418, to return media assets that are associated with a similar pattern of user ratings as the first media asset.

At 1106, if the second rating is higher than the first rating and the third rating, then the control circuitry 304 may, at 1110, identify a second media asset with a plot twist. For instance, if the user has rated an intermediate scene very highly, this may indicate the user's preference for fast-moving media assets with quick development and/or turning point(s). In response, the control circuitry 304 may identify a second media asset that also has a plot twist. For instance, the control circuitry 304 may search a database of a plurality of media assets, each media asset having one or more portions, and each portion associated with metadata. Each database entry may comprise a database entry such as the database entry 1000 depicted in FIG. 10. In such embodiments, the control circuitry 304 may search the miscellaneous information header 1016 in order to identify whether the second media asset is associated with a plot twist. In some embodiments, the control circuitry 304 may query a remote database, such as media guidance data source 418, to perform a search of the database and return a list of media asset results.

If the control circuitry 304 has not received a third user rating, then the control circuitry 304 may continue to 1112 and receive an average duration of a plurality of media assets. In some embodiments, the average duration may be received from local storage (such as storage 308 depicted in FIG. 3), for example by taking the average of media assets that are stored on the local storage. This information may be stored in storage 308 in a database with entries similar to database entry 1000 depicted in FIG. 10. In some embodiments, the average duration may be received from a remote source, such as media guidance data source 418. In such embodiments, the control circuitry 304 may send a query to the media guidance data source 418 through communications network 414, and the media guidance data source 418 may either retrieve the requested value from local storage or perform a calculation (such as calculating the average duration of a plurality of media assets) and may transmit the result back to the control circuitry 304. In some embodiments, the average duration of the plurality of media assets may be the average duration of a plurality of media assets that are the same type as the first media assets. For instance, if the first media asset is a movie, then user equipment (such as user equipment 402, 404, and/or 406) may transmit a request to media guidance data source 418 to provide a value for the average duration of movies. In some embodiments, the request may include a genre, such that the average duration of romantic comedy movies is requested. The control circuitry 304 may receive this information and store it in local storage, such as storage 308.

At 1114, control circuitry 304 may determine whether a duration of the first media asset is greater than the received average duration of the plurality of media assets. In some embodiments, the control circuitry 304 may take a time difference between the first portion and the second portion and determine whether the time difference is greater than the received average duration of the plurality of media assets. At steps 1116 and 1118, the control circuitry 304 may determine whether the second rating is higher than the first rating. At 1116, if the second rating is higher than the first rating, and if the duration of the first media asset is greater than the average duration, then the control circuitry 304 may continue to 1120 and identify a second media asset that is longer than the first media asset. In this situation, the higher second user rating may indicate that the user prefers longer media assets, and thus the control circuitry 304 may identify a second media asset that is longer than the first media asset. If the second rating is not higher than the first rating, then this may indicate the user does not prefer longer movies, and the control circuitry 304 may proceed to 1122, where it identifies a second media asset that is shorter in duration than the first media asset. As discussed above in relation to FIG. 7 and FIG. 8, the control circuitry 304 may identify the second media asset by searching a database of a plurality of media assets based on a property of the first media asset. In some embodiments, the property of the first media asset may be whether it is a "long" media asset (such as having a longer duration than an average duration of media assets of the same type) or whether it is a "short" media asset (such as having a shorter duration than an average duration of media assets of the same type). In some embodiments, the property of the first media may further comprise an indication that the first media asset has at least one turning point/plot twist, and a genre of the first media asset.

If the duration of the first media asset is not greater than the average duration of the plurality of media assets, then the control circuitry 304 may continue to 1118 and determine whether the second rating is higher than the first rating. If so, then the control circuitry 304 may continue to 1122 and identify a second media asset that is shorter than the first media asset. If the second rating is not higher than the first rating at 1118, then the control circuitry 304 may continue to 1120 and identify a second media asset that is longer than the first media asset.

In some embodiments, the metadata associated with the first portion and the second portion of the first media asset may comprise genre information that describes the respective portions of the first media asset. In such cases, the control circuitry 304 may further utilize this genre information to identify the second media asset. For example, each of the first and the second media asset may be described by database entries such as the database entry 1000 depicted in FIG. 10, including genre information that describes the content of various scenes in each media asset. The control circuitry 304 may compare the metadata associated with the second media asset with the metadata associated with the first media asset in order to identify a match. As an illustrative example, the control circuitry 304 may identify that both the first media asset and the second media asset have an action scene. In response to determining this match, the control circuitry 304 may identify the second media asset and recommend the second media asset for viewing by the user. In some embodiments, the control circuitry 304 will determine whether a number of matches in the metadata equals or exceeds a threshold value. For example, the control circuitry 304 may only identify the second media asset if the first media asset and the second media asset both have over a threshold value of ten action scenes. Once a second media asset is identified, the control circuitry may generate for display a list of the second media asset, for example, on display 312 depicted in FIG. 3.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for identifying media assets, the method comprising:

receiving a first user rating for a first portion of a first media asset, the first portion of the first media asset being associated with first metadata;

receiving a second user rating for a second portion of the first media asset, the second portion of the first media asset being associated with second metadata, wherein the second portion is different than the first portion;

determining whether the second user rating is higher than the first user rating;

storing a database that includes entries that each include a property of media assets field associated with a metadata field;

searching the metadata fields of the entries in the database to identify a first entry having metadata stored in the metadata field that matches the first metadata and the second metadata;

retrieving a first property stored in the property of media assets field of the identified entry from the database to determine that the first media asset is associated with the first property;

in response to determining that the second user rating is higher than the first user rating, identifying a second media asset that is associated with the first property associated with the first media asset; and in response to determining that the second user rating is not higher than the first user rating:

searching the property of media assets fields of the entries in the database to identify a second entry having a second property stored in the property of media assets field that does not match the first property;

retrieving the second property stored in the property of media assets field of the second entry from the database; and identifying a second media asset that associated with the second property and is not associated with the first property associated with the first media asset.

2. The method of claim 1, wherein the first metadata and the second metadata comprise at least one of the following: a start time of an associated scene, an end time of an associated scene, an indication that an associated scene is an introduction scene, an intermediate scene, a concluding scene, a plot twist, a buildup of the first media asset, a genre, a content tag, or a parental rating.

3. The method of claim 1, wherein the first property associated with the first media asset comprises at least one of: an indication that the first media asset is a long media asset, an indication that the first media asset is a short media asset, an indication that the first media asset has at least one turning point, and a genre of the first media asset.

4. The method of claim 1, wherein the first metadata comprises at least a start time associated with the first portion of the first media asset, wherein the second metadata comprises at least a start time associated with the second portion of the first media asset, and wherein the method further comprises:

calculating a time difference between the start time associated with the first portion of the first media asset and the start time associated with the second portion of the first media asset; and determining whether the time difference exceeds an average duration of a plurality of media assets.

5. The method of claim 4 further comprising:

determining that the first media asset is a long media asset if the time difference exceeds the average duration of a plurality of media assets;

determining that the first media asset is a short media asset if the time difference does not exceed the average duration of a plurality of media assets.

6. The method of claim 1, further comprising:

receiving a third user rating for a third portion of the first media asset, the third portion of the first media asset being associated with third metadata, and wherein the third portion is different than the first portion and the second portion; and determining whether the third user rating is higher than the first user rating and the second user rating, wherein the first property associated with the first media asset is further determined based on the third metadata.

7. The method of claim 6, wherein:

the second user rating is higher than the first user rating and the third user rating, the second media asset comprises a first portion, a second portion, and a third portion associated with a fourth user rating, a fifth user rating, and a sixth user rating, respectively, and the fifth user rating is higher than the fourth user rating and the sixth user rating.

8. The method of claim 6, wherein:

the second user rating is lower than the first user rating and the third user rating, and the second media asset is associated with a property that identifies the second media asset as including a plot twist.

9. The method of claim 1, wherein the first metadata comprises genre information regarding the first portion of the first media asset, and wherein the method further comprises:

identifying metadata associated with the second media asset, wherein the metadata associated with the second media asset comprises genre information regarding the second media asset;

comparing the metadata associated with the second media asset with the first metadata; and determining that the metadata associated with the second media asset matches the first metadata.

10. The method of claim 1, further comprising generating for display a listing of the second media asset.

11. A system for identifying media assets, the system comprising:

storage circuitry; and control circuitry configured to:

receive a first user rating for a first portion of a first media asset from the storage circuitry, the first portion of the first media asset being associated with first metadata;

receive a second user rating for a second portion of the first media asset from the storage circuitry, the second portion of the first media asset being associated with second metadata, wherein the second portion is different than the first portion;

determine whether the second user rating is higher than the first user rating;

store a database that includes entries that each include a property of media assets field associated with a metadata field;

search the metadata fields of the entries in the database to identify a first entry having metadata stored in the metadata field that matches the first metadata and the second metadata;

retrieve a first property stored in the property of media assets field of the identified entry from the database to determine that the first media asset is associated with the first property;

in response to determining that the second user rating is higher than the first user rating, identify a second media asset that is associated with the first property associated with the first media asset; and in response to determining that the second user rating is not higher than the first user rating:

search the property of media assets fields of the entries in the database to identify a second entry having a second property stored in the property of media assets field that does not match the first property;

retrieve the second property stored in the property of media assets field of the second entry from the database; and identify a second media asset that is associated with the second property and is not associated with the first property associated with the first media asset.

12. The system of claim 11, wherein the first metadata and the second metadata comprise at least one of the following: a start time of an associated scene, an end time of an associated scene, an indication that an associated scene is an introduction scene, an intermediate scene, a concluding scene, a plot twist, a buildup of the first media asset, a genre, a content tag, or a parental rating.

13. The system of claim 11, wherein the first property associated with the first media asset comprises at least one of: an indication that the first media asset is a long media asset, an indication that the first media asset is a short media asset, an indication that the first media asset has at least one turning point, and a genre of the first media asset.

14. The system of claim 11, wherein the first metadata comprises at least a start time associated with the first portion of the first media asset, wherein the second metadata comprises at least a start time associated with the second portion of the first media asset, and wherein the control circuitry is further configured to:

calculate a time difference between the start time associated with the first portion of the first media asset and the start time associated with the second portion of the first media asset;

determine whether the time difference exceeds an average duration of a plurality of media assets.

15. The system of claim 14, wherein the control circuitry is further configured to:

determine that the first media asset is a long media asset if the time difference exceeds the average duration of a plurality of media assets;

determine that the first media asset is a short media asset if the time difference does not exceed the average duration of a plurality of media assets.

16. The system of claim 11, wherein the control circuitry is further configured to:

receive a third user rating for a third portion of the first media asset from the storage circuitry, the third portion of the first media asset being associated with third metadata, and wherein the third portion is different than the first portion and the second portion; and determine whether the third user rating is higher than the first user rating and the second user rating, wherein the control circuitry is configured to further determine the first property associated with the first media asset based on the third metadata.

17. The system of claim 16, wherein:

the second user rating is higher than the first user rating and the third user rating, the second media asset comprises a first portion, a second portion, and a third portion associated with a fourth user rating, a fifth user rating, and a sixth user rating, respectively, and the fifth user rating is higher than the fourth user rating and the sixth user rating.

18. The system of claim 16, wherein:

the second user rating is lower than the first user rating and the third user rating, and the second media asset is associated with a property that identifies the second media asset as including a plot twist.

19. The system of claim 11, wherein the first metadata comprises genre information regarding the first portion of the first media asset, and wherein the control circuitry is further configured to:

identify metadata associated with the second media asset, wherein the metadata associated with the second media asset comprises genre information regarding the second media asset;

compare the metadata associated with the second media asset with the first metadata; and determine that the metadata associated with the second media asset matches the first metadata.

20. The system of claim 11, wherein the control circuitry is further configured to generate for display a listing of the second media asset.

* * * * *